United States Patent Office 3,410,583
Patented Nov. 12, 1968

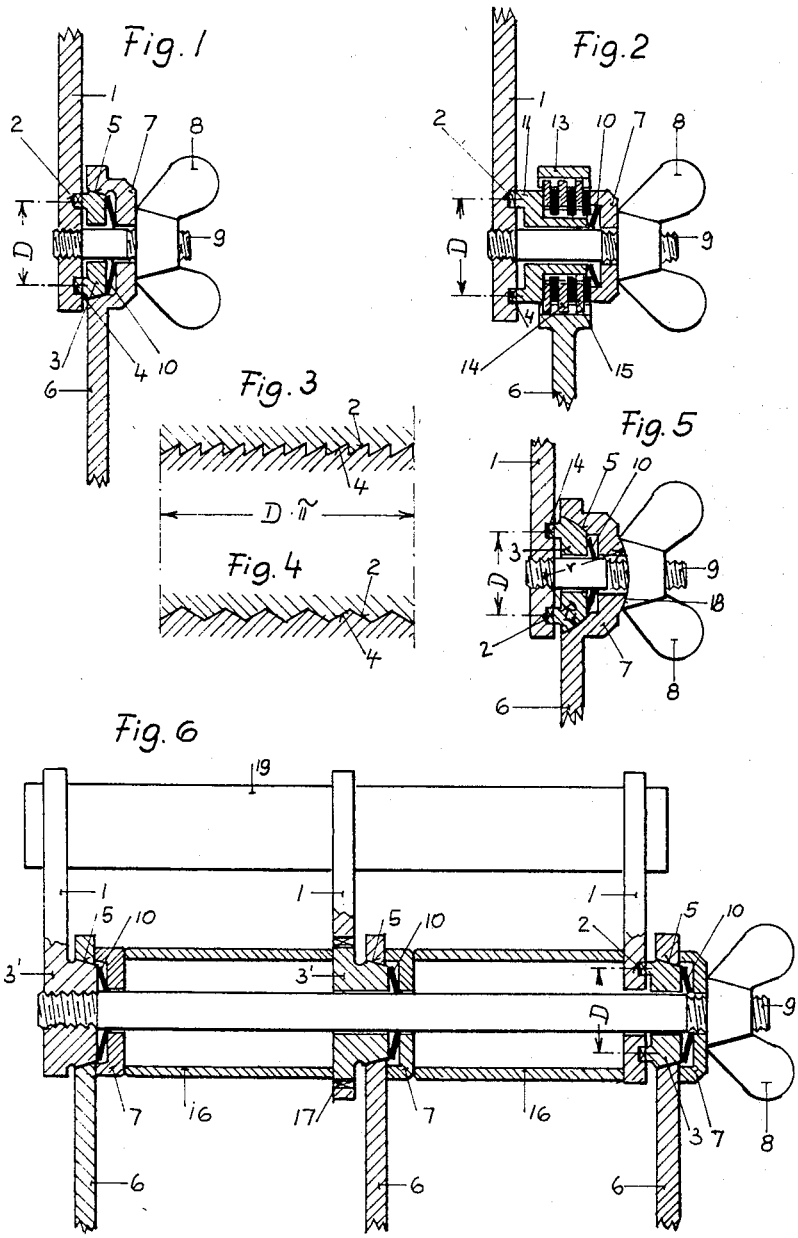

3,410,583
INFINITELY VARIABLE ADJUSTING AND
LOCKING DEVICE
Werner E. Altmann, Knoedelstrasse 4,
Stuttgart 13, Germany
Filed Apr. 6, 1966, Ser. No. 540,547
Claims priority, application Germany, Apr. 6, 1965,
A 48,849
12 Claims. (Cl. 287—14)

ABSTRACT OF THE DISCLOSURE

A device for adjusting two or more arms or other elements pivotable about a common axis to any desired relative angular positions and for locking the elements in the adjusted position, including opposed cam surfaces, one of which is formed on a first surface of one of the arms or elements with the mating surface being formed on one end of a locking member disposed between the arms or other elements and mounted rotatably upon the common axis. The present invention further contemplates at least one pair of opposed friction surfaces, one of which is formed by the exterior surface of the locking member, while its mating surface is formed by the interior surface of a bore in a second arm or element. Additionally, the device according to the present invention further includes a biasing spring interposed between the locking member and the second arm or other element and a tightening means for overcoming the force of the biasing spring to cause engagement of the opposed cam surfaces and opposed friction surfaces, thereby locking the arms or other elements in the predetermined relative angular position thereof.

---

The present invention relates to an infinitely variable device for adjusting at least two arms or other elements which are connected to each other so as to be rotatable or pivotable about a common axis to any desired angular positions relative to each other and for locking them in the adjusted position by associated friction means which may be tightly applied upon each other by one or more bolts or the like. Although such devices may be employed for innumerable purposes, they are especially adapted for tightening nets, ropes, cables, or holding means and for adjusting the angular position of beds, chairs or similar articles of furniture and the different parts thereof, such as the seats and the arm and back rests of such furniture articles, or of drawing boards, working implements, and the like.

The infinitely variable adjusting and locking devices of the above-mentioned type which were known prior to this invention generally have the disadvantage that, when they are subjected to a considerable load, their arms or similar elements do not remain in their adjusted position in which they are held by the bolts or the like, but have the tendency to slip relative to each other and then possibly to regrab in another position. Furthermore, the clamping means of these devices have to be loosened for considerable distances in order to permit the arms or other elements to be freely movable relative to each other. Since these clamping means themselves are also often subjected to high stresses, they have to be made of considerable dimensions in order to be sufficiently safe from breakage.

It is an object of the present invention to provide an infinitely variable adjusting and locking device of the type as mentioned above which is of a very simple and inexpensive construction and completely overcomes the mentioned disadvantages of similar devices according to previous designs. According to the invention this is accomplished by providing a clamping or locking member which is adapted to be connected by friction surfaces to one of the two arms or elements which are pivotally connected and adjustable relative to each other, and by providing this clamping member and the other arm or element with associated cam means which, when a torque is exerted upon one or both of these arms or elements, will shift the clamping member in a direction in which it increases the friction between the friction surfaces to such an extent as to lock them—and thereby also the two arms or elements—rigidly to each other. Therefore, the greater the torque which is exerted upon one or both of the arms or elements, the greater will also be the locking effect between them.

Another important feature of the invention consists in the provision of suitable spring means which act upon the clamping member so as to disconnect the friction surfaces from each other as soon as the connecting bolt or similar member is loosened by means of which the two arms or elements are pivotally connected to each other. These spring means have the further important purpose of maintaining the associated cam means in constant engagement with each other.

The mentioned cam means preferably consist of an annular row of inclined cam surfaces or serrations which are impressed into one of the arms or elements around the connecting bolt, and of a corresponding annular row of inclined cam surfaces or serrations on one side of the clamping member, the friction surface or surfaces of which are adapted to be applied against the corresponding friction surface or surfaces on the other arm or element.

According to another feature of the invention, these inclined cam surfaces or serrations may be provided either so as to extend and be effective in both directions of rotation of the arms or elements relative to each other so as to shift the clamping member and thereby to increase the locking effect between the two arms or elements, or they may be inclined and produce a locking effect only in one direction of rotation, while when a torque is exerted upon one or both arms or elements in the other direction, the clamping member will not be shifted and the normal friction between the associated friction surfaces will therefore not be increased and the two arms or elements may be turned or pivoted in this direction relative to each other.

The cam surfaces are therefore preferably inclined at such an angle that the axial force which is thereby produced and exerted upon the clamping member when a torque is exerted upon one of the arms or elements will increase the friction between the associated friction surfaces to such an extent that these surfaces can no longer slip on each other but be rigidly locked to each other.

According to one embodiment of the invention which is preferred because of its simplicity, the clamping member consists of a conical ring which is provided with the inclined cam surfaces in one end surface thereof which are in constant engagement with the corresponding cam surfaces on one of the arms or elements which are to be adjusted and locked, while the conical main part of this ring is inserted into a conical bore in the other arm or element and engages with friction with the conical wall of this bore. This conical ring is preferably acted upon by one side of a cup or plate spring which maintains the inclined cam surfaces in constant engagement with each other, while the other side of this spring acts either directly or through a cup-shaped washer upon the other arm or element so as to disengage the conical friction surfaces from each other as soon as the connecting bolt between the two arms or elements or a nut on this bolt is slightly loosened.

According to another preferred embodiment of the invention, the clamping member, one end surface of which is again provided with inclined cam surfaces which engage with the corresponding cam surfaces on one of the arms or elements, has one or more friction disks connected thereto which are adapted to engage with one or more other friction disks which are connected to the other arm or element.

The present invention further provides that two or more locking devices of the type as described may be combined with each other by pivotally connecting two sets of arms or other elements to each other so as to be pivotable about the axis of a common bolt which only has to be provided with a nut on one end for tightening and loosening all of the clamping members on the different arms. Although all of these clamping members may then be provided with inclined cam surfaces as previously described, it will usually suffice if only one of them is provided with such cam surfaces which, although acting upon the corresponding cam surfaces on only one of the arms or elements of the set which is to be adjusted relative to the other set, will also act indirectly upon the clamping members on the other arms or elements of this set so as to produce the desired locking effect between all of the arms.

Another modification of the invention consists in making the associated conical friction surfaces of the first embodiment as previously described, or the friction disks of the second embodiment, as well as the contact surfaces between the second arm or element or the cup-shaped washer thereon, and the nut on the connecting bolt of a spherical or rounded shape which will better adapt themselves to each other and eliminate inaccuracies which easily occur in the production of plane surfaces and which would have to be overcome by tightening the clamping nut excessively.

The features and advantages of the present invention will become more clearly apparent from the following detailed description thereof which is to be read with reference to the accompanying drawings, in which:

FIGURE 1 shows a side view, partly in cross section, of an adjusting and locking device according to one preferred embodiment of the invention;

FIGURE 2 shows a similar view of an adjusting and locking device according to a modification of the invention;

FIGURE 3 shows a development of the annular row of cam surfaces according to FIGURES 1 and 2 when these surfaces are inclined in only one direction of rotation;

FIGURE 4 shows a development of the annular row of cam surfaces according to FIGURES 1 and 2 when these surfaces are inclined in both directions of rotation;

FIGURE 5 shows a cross section of a modification of the adjusting and locking device according to FIGURE 1; while FIGURE 6 shows a side view, partly in cross section, of an adjusting and locking unit according to the invention which consists of three devices which are similar to the device as shown in FIGURE 1 and are adapted to be locked and released by a single clamping nut.

The adjusting and locking device according to the invention as illustrated in FIGURE 1 comprises two arms or other elements 1 and 6 which are pivotally connected to each other by a bolt 9 and are adapted to be adjusted to any desired angular position relative to each other about the axis of bolt 9 and to be locked in the adjusted position by tightening a wing nut 8 on the end of bolt 9. For this purpose, the left arm 1 is provided, for example, by stamping, with a series of serrated cam surfaces 2 which form an annular row coaxially to bolt 9 and are either inclined in one direction of rotation, as illustrated by the development according to FIGURE 3, or in both directions of rotation, as illustrated by the development according to FIGURE 4. These cam surfaces 2 are in engagement with corresponding inclined cam surfaces 4 on one end surface of a conical locking ring 3, the conical outer friction surface of which fits into a corresponding conical bore 5 in the right arm 6. Bolt 9 is rigidly secured at one end to the left arm 1 and, by cooperation with wing nut 8 which acts upon a cup-shaped part 7, it is adapted to apply the two conical surfaces of locking ring 3 and bore 5 tightly against each other. While this part 7 is illustrated in FIGURE 1 as being integral with the arm 6, it may also be provided in the form of a separate cup-shaped washer which acts upon the outer surface of the arm 6 when the wing nut 8 is tightened. While the exertion of a torque of a sufficient strength upon arm 1 would normally permit the conical surfaces of ring 3 and bore 5 to slide along each other and the arms 1 and 6 to pivot relative to each other, this will be prevented according to the invention by the inclined cam surfaces 2 and 4. When a torque is exerted, for example, upon the left arm 1 so as to pivot the same very slightly relative to the right arm 6, an axial force will be produced by the cam action of the inclined cam surfaces 2 on the corresponding cam surfaces 4 which will then press the conical locking ring 3 more deeply into the conical bore 5 in the arm 6 and the two conical surfaces so tightly against each other that they will be rigidly connected to each other and the two arms 1 and 6 will thus be locked in the particular angular position to which they have previously been adjusted relative to each other. Consequently, the greater the torque which is exerted upon one of the arms 1 or 6, the greater will be the axial force which is produced by the cam surfaces 2 and 4 and the more secure will also be the locking action between the conical surfaces of ring 3 and bore 5 in the arm 6. If the arms 1 and 6 are to be adjusted to a different angular position relative to each other, the wing nut only needs to be slightly loosened. A plate or cup spring 10 which is inserted into the cup-shaped part 7 will then act upon the cup-shaped part 7 and loosen the locking connection between the conical surfaces of locking ring 3 and bore 5 at least to such an extent that these two surfaces may again slide along each other and the two arms 1 and 6 may be pivoted to a different position relative to each other. Spring 10 has the additional important function of maintaining the inclined cam surfaces 2 and 4 constantly in engagement with each other.

If the cam surfaces 2 and 4 are inclined in both directions of rotation as illustrated in FIGURE 4, they will produce an axial locking force upon the locking ring 3 when a torque is exerted upon the arms 1 and 6 in either direction. If, however, these cam surfaces 2 and 4 are inclined in only one direction, as illustrated in FIGURE 3, they will not exert an axial locking force upon ring 3 when a torque is exerted in the opposite direction. The conical surfaces of locking ring 3 and in bore 5 will then not be locked together but be capable of sliding along each other so that the two arms 1 and 6 may be pivoted in this direction relative to each other. However, as soon as the torque is reversed and exerted in the direction of inclination of cam surfaces 2 and 4, the latter will act upon each other and lock the two arms in the angular position to which they were last adjusted.

Although differing structurally to a certain extent, the adjusting and locking device as illustrated in FIGURE 2 operates in the same manner as the device according to FIGURE 1. The locking ring 11 which is again provided with inclined cam surfaces 4 which under the action of spring 10 are held in constant engagement with the corresponding cam surfaces 2 on the arm 1 is in this case provided with a plurality of friction disks 15 which are rigidly connected thereto and are adapted to engage with corresponding friction disks 14 which are rigidly connected to the head 13 of the arm 6. If the wing nut 8 is tightened on the cup-shaped washer 7, and a torque is then exerted upon the arm 1 in the direction of inclination of the cam surfaces 2 and 4 according to FIGURE 3 or in either direction when the cam surfaces are inclined in both directions as shown in FIGURE 4, the axial force which is then produced will clamp the friction disks 5 tightly against each other and thereby lock the two arms 1 and 6 in the particular position to which they were adjusted. As soon as the wing nut 8 is loosened, spring 10 will loosen the locking connection between the friction disks 14 and 15 but maintain the cam surfaces 2 and 4 in interengagement with each other. The two arms 1 and 6 may then be pivoted relative to each other.

FIGURE 5 illustrates a modification of the adjusting and locking device according to FIGURE 1. The conical surfaces 3 and 5 are in this case of a spherical shape and the contact surfaces of the wing nut 8 and the cup-shaped part 7 on arm 6 are likewise of a spherical shape. The two arms 1 and 6 therefore do not need to extend exactly parallel to each other, but may still be pivoted relative to each other and securely locked together.

FIGURE 6 illustrates a locking unit according to the invention, in which three arms 1 are pivotably connected with three other arms 6 by a single bolt 9 and by three adjusting and locking devices each of which comprises a set of friction cones 3 and 5 and all of which may be tightened or loosened by a single wing nut 8 on the free end of bolt 9. It is, of course, similarly possible to connect an even larger number of arms 1 and 6 to each other by a corresponding number of adjusting and locking devices and a single bolt 9 and a single nut 8. In the particular embodiment of the invention as shown in FIGURE 6, the associated inclined cam surfaces 2 and 4 are only provided on the arm 1 and the locking ring 3 of the locking device at the right side of the drawing, although they may instead or in addition also be provided on the central or left arm 1 and on a corresponding ring 3 which is associated with the respective arm. Those locking rings 3', as shown in FIGURE 6, which are not provided with inclined cam surfaces should be nonrotatably connected to the respective arms 1, preferably by means of splines 17, as shown on the central arm 1, which permit the locking rings 3' to slide in the axial direction relative to the arms 1 in order to compensate for inaccuracies in manufacture. This is especially advisable if a connecting member 19 between the three arms 1 is omitted.

When the wing nut 8 is tightened on bolt 9, the cup-shaped washer 7 at the right side of the drawing will press against the right arm 6 and apply the conical surfaces of bore 5 and locking ring 3 against each other. This locking ring 3 then acts through the cam surfaces 2 and 4 upon the right arm 1 which, in turn, acts through a spacing tube 16 and another cup-shaped washer 7 upon the central arm 6 so that the conical bore 5 thereof is likewise pressed upon the central conical locking ring 3' which then acts through the second spacing tube 16 and the left cup-shaped washer 7 upon the left arm 6, the conical surface 5 of which is then pressed upon the left locking ring 3' which is rigidly secured to the left end of bolt 9.

If a torque is exerted upon the arms 1 in the direction of the inclined cam surfaces 2 and 4 on the right arm 1 and locking ring 3, the axial force which is thereby produced will force this ring tightly into the conical bore 5 in the right arm 6 so that the right arms 1 and 6 will be firmly locked to each other. At the same time, this axial force is transmitted through bolt 9 to the left locking ring 3' on the left arm 1, and this locking ring 3' is thereby likewise wedged tightly into the conical bore 5 in the left arm 6. This left arm 6, in turn, transmits the axial force through the cup-shaped washer 7 and the left spacing tube 16 to the locking ring 3' on the central arm 1 which is thereby likewise wedged tightly into the conical bore 5 in the central arm 6. The slight axial movement of the right locking ring 3 which is produced by the torque on the arms 1 in the direction of inclination of cam surfaces 2 and 4 therefore produces a secure locking effect between all of the arms 1 and 6.

If wing nut 8 is slightly loosened, springs 10 will immediately loosen the locking connection between the conical surfaces on all locking rings 3 and 3' and the conical bores 5 in all arms 6 so that the two sets of arms 1 and 6 may then be adjusted to a different angular position relative to each other.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. An infinitely variable adjusting and locking device comprising, in combination, at least two elements, a connecting member pivotably securing said elements together, having an axis for connecting said elements so as to be relatively rotatable about said axis, a separate locking member intermediate said two elements, opposed friction surface means on said locking member and on the first of said elements adapted to frictionally engage each other, opposed cam means on said locking member and on the second element adapted to produce an axial force for shifting said locking member away from said second element and toward said first element when a differential torque is exerted upon said elements, thereby urging said opposed friction surface means into a locking engagement with each other, means engaging with said connecting member for tightening said connecting member to cause engagement of said opposed friction surface means with each other and said opposed cam means with each other, and resilient biasing means between said locking member and said first element, acting upon said locking member for immediately releasing said opposed friction surface means from said locking engagement with each other when said tightening means on said connecting member are slightly loosened, thus permitting said two elements to be rotated relative to each other while maintaining said opposed cam means in engagement with each other when said tightening means are either tightened or slightly loosened.

2. A device as defined in claim 1, in which said opposed friction surface means comprise mating spherically curved friction surfaces on said locking member and on said first element adapted to frictionally engage each other when said tightening means are tightened and to be locked to each other when a differential torque is exerted upon said elements.

3. A device as defined in claim 1, in which said opposed cam means comprise corresponding angularly-inclined cam surfaces on said second element and on said locking member, said cam surfaces being inclined at such a small angle that the axial force which is produced when a torque is exerted upon said second element so as to lock said opposed friction surface means to each other will be only slightly greater than the force of the friction produced between said opposed friction surface means when said tightening means are tightened.

4. A device as defined in claim 1, in which said opposed friction surface means comprise a conical bore in said first element and an outer conical surface on said locking member adapted to engage with the wall of said conical bore when said tightening means are tightened.

5. A device as defined in claim 1, in which said opposed friction surface means comprise at least one friction disk on said locking member and at least one friction disk on said first element adapted to engage with each other when said tightening means are tightened.

6. A device as defined in claim 1, in which said locking member comprises a ring, said cam means comprising an annular row of serrations on one side of said second element substantially coaxially to and radially spaced from said connecting member and an annular row of corresponding serrations on one end surface of said ring.

7. A device as defined in claim 6, in which said serrations are inclined in both directions of rotation of said second element relative to said first element so as to produce said axial force and locking effect when a torque is exerted upon said second element in either direction of rotation.

8. A device as defined in claim 6, in which said serrations are inclined in only one direction of rotation of said second element relative to said first element so as to produce said axial force and locking effect only when a torque is exerted upon said second element in said one direction of rotation, while in the other direction of rotation of said second element no locking effect is produced between said opposed friction surface means so that said opposed friction surface means are frictionally slidable along each other and said two elements are rotatable relative to each other.

9. A device as defined in claim 1, in which said connecting member comprises a bolt secured at one end to said second element and threaded over at least a portion thereof from the other end, and extending substantially at right angles to said elements, said first element having a conical bore, said locking member comprising a ring having an outer conical surface engaging into said conical bore, said opposed cam means comprising an annular row of serrations on one side of said second element substantially coaxial to and radially spaced from said bolt and an annular row of corresponding serrations on one end surface of said ring and engaging with said serrations on said second element, a cup-shaped member on said first element having a central bore, said resilient means comprising a compression spring within said cup-shaped member, acting at one side upon the other end surface of said ring and at the other side upon said cup-shaped member, said bolt extending substantially centrally through said ring, said spring and said bore of said cup-shaped member, and said tightening means comprises a threaded fastener threaded upon said other end of said bolt and adapted to be tightened against the outer side of said cup-shaped member.

10. A device as defined in claim 1, in which said connecting member comprises a bolt secured at one end to said second element and threaded over at least a portion thereof from the other end, and extending substantially at right angles to said elements, said first element having a bore, said locking member comprising a tubular part extending into said bore, said opposed friction surface means comprising a plurality of first friction disks secured to and projecting outwardly from said tubular part and a plurality of second friction disks secured to and projecting inwardly from the wall of said bore, said first and second friction disks being adapted to engage between and laterally with each other, said opposed cam means comprising an annular row of serrations impressed into said second element substantially coaxially to and radially spaced from said bolt and an annular row of corresponding serrations on one end surface of said tubular member and engaging with said impressed serrations on said second element, a cup-shaped washer having a bore and adapted to act upon said friction disks to press the same against each other, said resilient means comprising a compression spring within said cup-shaped washer and acting, at one side, upon the other end surface of said tubular part and, at the other side, upon said cup-shaped washer, said bolt extending substantially centrally through said tubular part, said spring and said cup-shaped washer, and a threaded fastener threaded upon the other end of said bolt and adapted to be tightened against the outer side of said cup-shaped washer.

11. An infinitely variable adjusting and locking device comprising, in combination, a plurality of elements forming pairs, the corresponding elements of said pairs being laterally spaced from and substantially parallel to each other, a single bolt connecting all of said elements so as to permit said corresponding elements of said pairs to rotate relative to each other about the axis of said bolt, opposed friction surface means on all of said pairs except one outer pair, said friction surface means being adapted to frictionally engage each other, a first element of said outer pair having a conical bore, a separate locking ring having a conical outer peripheral surface within said bore and frictionally engaging with the conical surface thereof, a first annular row of angularly inclined cam surfaces on one end surface of said locking ring, and a second annular row of corresponding cam surfaces on one side of the second element of said outer pair and in engagement with said first annular row, said cam surfaces being adapted to produce an axial force for shifting said locking ring away from said second element and toward said first element, thereby urging said conical surface of said ring into a locking engagement with the wall of said conical bore and for thereby locking said first and second elements to each other when a differential torque is exerted upon said first and second elements, means on said bolt for tightening said bolt and for frictionally engaging said opposed friction surface means with each other and also said conical surfaces of said bore of said first element and of said locking ring with each other, and resilient biasing means between said locking member and said tightening means, acting upon said locking ring and said first element for immediately releasing said locking ring from its locking engagement with said first element when said tightening means on said bolt are slightly loosened so as to permit all corresponding elements of said pairs to be rotated relative to the other corresponding elements, said resilient element being also adapted to maintain said associated cam surfaces in engagement with each other when said tightening means are either tightened or slightly loosened.

12. A device as defined in claim 11, further comprising spacing means between one element of each pair and the other element of the adjacent pair for transmitting said axial force, when produced on said outer pair, through said bolt and said spacing means to said friction means of the other pairs so as also to lock said other pairs of elements to each other when said first and second elements of said outer pair are locked.

References Cited

UNITED STATES PATENTS

| 968,753 | 8/1910 | Ellsworth | 267—9 |
|---|---|---|---|
| 1,052,013 | 2/1913 | Schimmel | 267—9 |
| 1,212,837 | 1/1917 | Stewart | 287—14 XR |
| 2,075,991 | 4/1937 | Kessler | 188—130 XR |
| 2,410,088 | 10/1946 | Lundquist | 287—101 XR |

FOREIGN PATENTS

| 508,454 | 10/1920 | France. |
|---|---|---|

CARL W. TOMLIN, *Primary Examiner.*

ANDREW KUNDRAT, *Assistant Examiner.*